Figure 1:
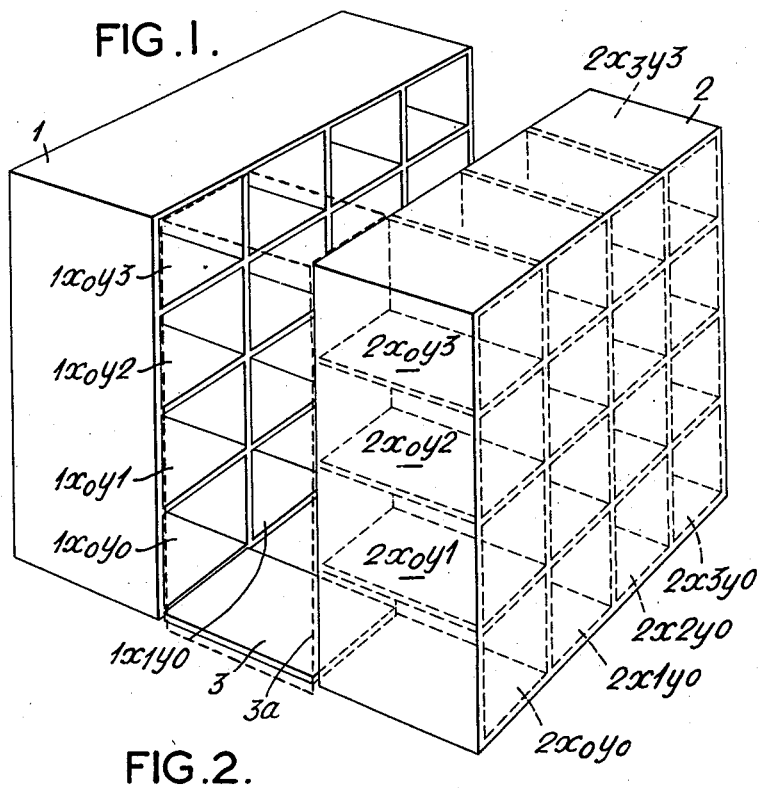

Nov. 17, 1964 T. J. F. OLDHAM 3,157,296
CONTROL SYSTEMS FOR LOAD-CONVEYING INSTALLATIONS
Filed Nov. 23, 1960 5 Sheets-Sheet 1

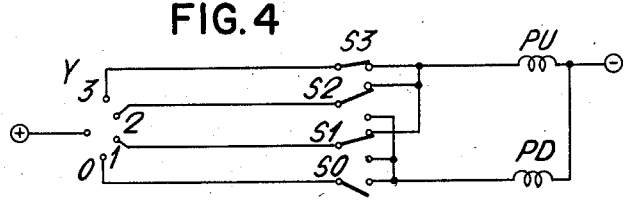
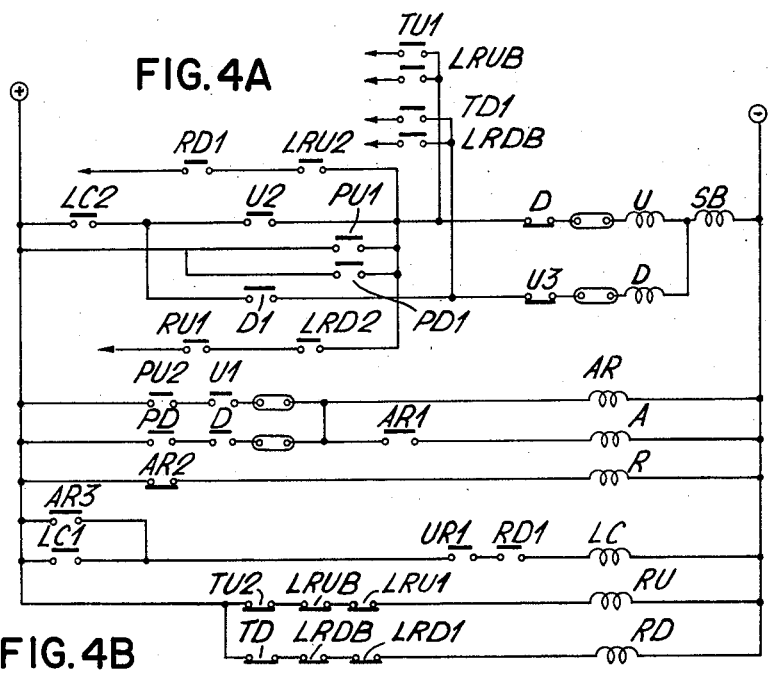
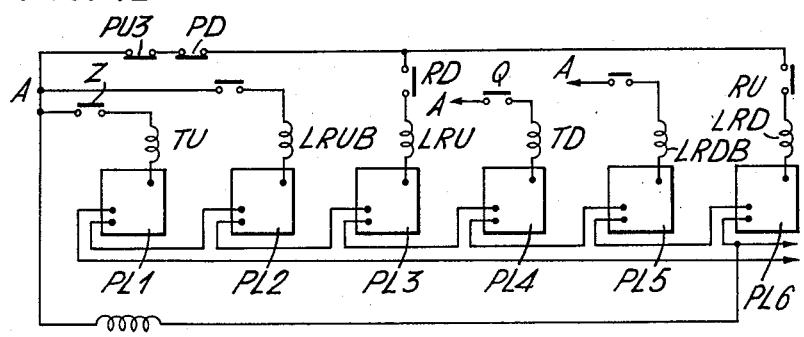

Nov. 17, 1964 T. J. F. OLDHAM 3,157,296
CONTROL SYSTEMS FOR LOAD-CONVEYING INSTALLATIONS
Filed Nov. 23, 1960 5 Sheets-Sheet 5

United States Patent Office 3,157,296
Patented Nov. 17, 1964

3,157,296
CONTROL SYSTEMS FOR LOAD-CONVEYING
INSTALLATIONS
Thomas John Frederick Oldham, Rugby, England, assignor to Associated Electrical Industries Limited, London, England, a British company
Filed Nov. 23, 1960, Ser. No. 71,337
Claims priority, application Great Britain Nov. 24, 1959
9 Claims. (Cl. 214—16.4)

This invention relates to systems for controlling the operation of load-conveying installations for depositing a load into or removing a load from a predetermined storage compartment of a compartmented multi-level load storage structure. More specifically, the invention is directed to electrical control systems for such load-conveying installations of the charatcer in which respective storage compartments of said load storage structure and the load conveyor have pivoted floors whereby a load can be deposited into or removed from a storage compartment after driving the loaded or unloaded conveyor, as the case may be, to a predetermined position adjacent said compartment by arranging that the floor of said conveyor at said position is similarly inclined and in alignment with that of the compartment so that the load can move under gravity into said compartment from the conveyor, or vice versa, according to the direction of inclination of said floors. Except when a load is in process of being removed from a storage compartment the floors of respective storage compartments may always be inclined as for receiving a load from the conveyor whereas the floor of the latter may normally be level or inclined as for depositing a load into the compartment or it may require tilting to facilitate the discharge of the load into the compartment. Thus, for removing a load from the compartment, the floor of the latter must be tilted to reverse its normal direction of inclination as may that of the conveyor if it is normally inclined as for discharging a load into said compartment. The tilting of at least the compartment floors may be effected by relatively short vertical displacements of the conveyor in the appropriate directions after mechanically coupling adjacent floor edges of the conveyor and said compartment, such as for example by means of locking bolts. Load stops may be provided in the conveyor for the purpose of locating and/or retaining a load therein.

Installations of the character set forth above are eminently suitable for the storage or parking of motor cars and like vehicles, but they may also be employed for the storage of other free running (e.g. wheeled) objects.

In accordance with the present invention a control system is provided for a load-conveying installation of the character hereinbefore set forth having electric driving means for the conveyor, said system comprising selective switching means adapted to be pre-set according to whether a load is required to be deposited into or removed from a load storage compartment, sequence switching means selectable in accordance with the setting of the selective switching means and operable at predetermined intervals for initiating and controlling a desired sequence of operations of the installation, switching means for at least partly selecting the load storage compartment to be utilised and arranged for controlling said driving means whereby said conveyor will be driven to a predetermined position adjacent the selected storage compartment during at least one operation controlled by the sequence switching means, said sequence switching means controlling in predetermined sequence and at appropriate intervals the operation of electric switching means for providing at least for removing a load from a storage compartment relatively short vertical displacement of said conveyor upon the latter reaching the aforesaid predetermined position and the operation of electrically-actuated means for mechanically coupling the floor of said conveyor with that of the selected compartment. The sequence switching means may also control the operation of electrically-actuated load stops for the purpose of locating and/or retaining the load in the conveyor.

The switching means for controlling driving of the conveyor to the selected storage compartment conveniently comprises one or more groups of mechanically-actuated switches arranged so that said switching means maintains a driving circuit for the conveyor until said selected compartment is reached.

Where the load storage structure comprises superimposed rows of storage compartments necessitating both horizontal and vertical driving circuits for the conveyor to gain access to any compartment, the switching means just above referred to may comprise groups of mechanically-actuated switches appertaining to the respective columns of compartments for controlling horizontal driving of the conveyor to that column containing the selected compartment and groups of mechanically-actuated switches appertaining to the respective rows of the storage structure for controlling vertical drive of the conveyor to the selected compartment. For the purpose of selecting a storage compartment the switching means preferably comprises a pair of selector switches one of which selects the column containing said compartment and the other of which selects the level (or row) of said compartment in the storage structure, said selectors being respectively connected in circuits containing the above-mentioned groups of mechanically-actuated switches appertaining to the respective columns and levels of the storage structure. The sequence switching means and drive control switching means may be arranged such that horizontal and vertical drive of the conveyor are performed simultaneously or sequentially.

Still further, the load storage structure may take the form of two opposed groups of storage compartments, each group comprising superimposed storage compartments and the two groups defining an air space therebetween allowing room for the conveyor to be driven to a position adjacent any pair of opposed compartments under the control of the switching means for at least partly selecting the storage compartment, the selection of one compartment from the pair preferably being effected by means of the aforesaid selective switching means.

The previously mentioned electric switching means for providing relatively small vertical displacement of the conveyor by appropriate operation of the driving means may comprise a number of pliotron units of the kind described in British Patent No. 316,193 carried by the conveyor and operable sequentially as determined by the selected sequence switching means and by the disposition of metallic vanes relatively to sensing coil means of the pliotron units when the conveyor reaches a position adjacent the selected compartment.

The means for coupling the floor of the conveyor with that of a selected compartment may comprise one or more electro-hydraulic thrustors or other power-actuated devices which in operating cause a rigid bolt or bolts to be thrust through bearing holes formed in reinforced end pieces of the conveyor and compartment floors; the holes are coaxial when the conveyor is correctly aligned with a compartment.

The load stops may also be actuated by means of electro-hydraulic thrustors or other power-actuated devices, the stops operating in the load storage structure, i.e. in a load receiving compartment being subject to a local electric switch means, such as a roller-lever operated switch moved by a power-driven element (e.g. cam) mounted on the conveyor, and arranged to engage the lever operated switch when the conveyor is aligned with a compartment.

Figure 2:
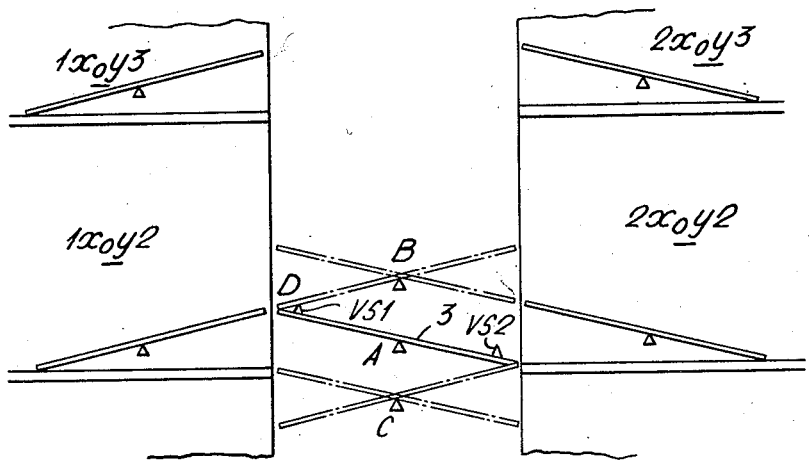
Figure 2A:
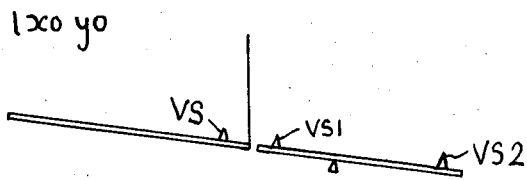
Figure 7:
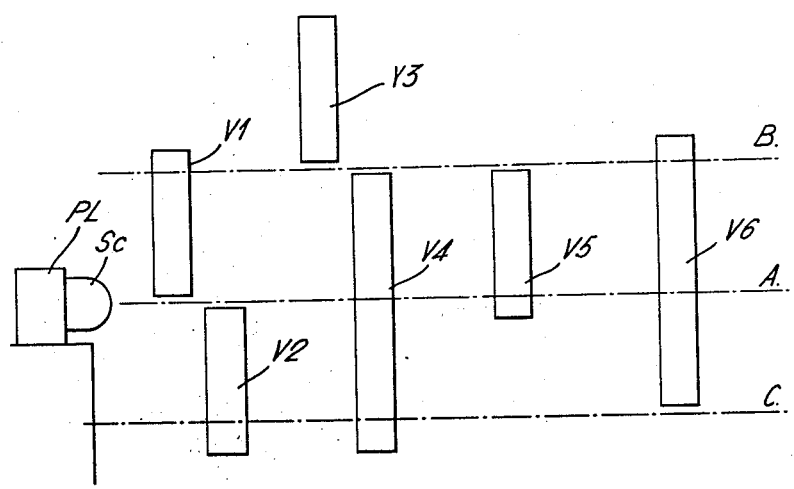
Figure 3:
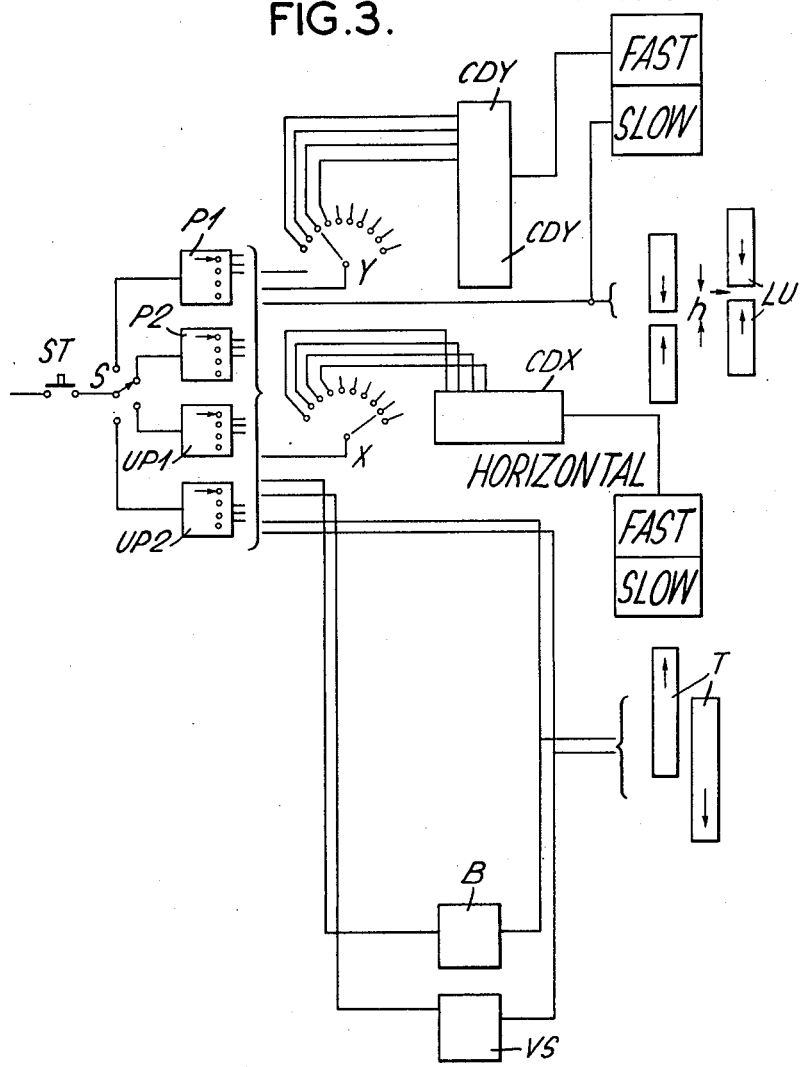
Figure 5:
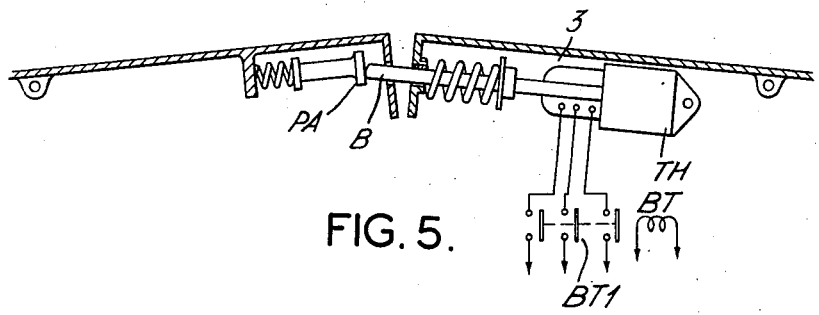
Figure 6:
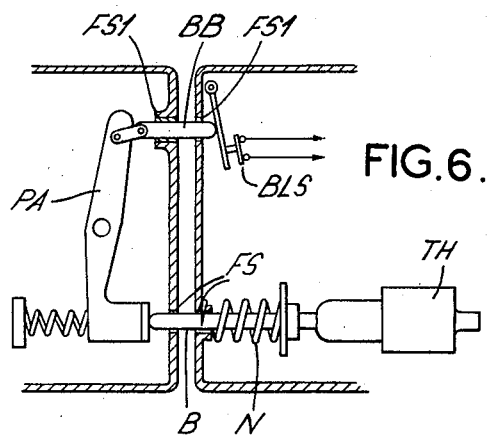
Figure 8:
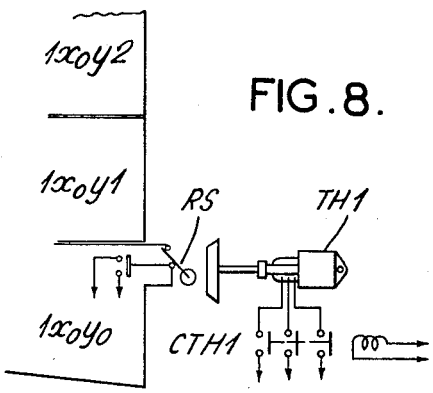

An exemplary embodiment of the invention as applied to an installation of the character hereinbefore defined for parking cars and like vehicles will now be described with reference to the accompanying drawings, in which:

FIG. 1 is a diagrammatic perspective view of the main storage structure of the installation comprising two banks of vehicle storage compartments defining therebetween a well providing for horizontal and vertical motion of a vehicle conveyor, FIG. 2 is a diagrammatic view illustrating inter alia the various positions assumed by the vehicle conveyor during the transfer of a load between the conveyor and a typical pair of storage compartments, FIG. 2A is a diagrammatic view showing the vehicle conveyor adjacent a vehicle receiving compartment, FIG. 3 is a block schematic diagram of a control system provided in accordance with the invention for controlling the operation of the vehicle parking installation, FIGS. 4, 4A and 4B show a circuit arrangement for controlling the vertical drive of the vehicle conveyor, FIGS. 5 and 6 are fragmentary views depicting the means for coupling the floor of the conveyor with that of a selected vehicle storage compartment, FIG. 7 shows means for controlling relatively small vertical displacements of the conveyor to facilitate parking and unparking of vehicles, and FIG. 8 shows switching means for controlling the actuation of vehicle stops within a vehicle storage compartment.

Referring to FIGS. 1 and 2 of the drawings, the vehicle parking installation illustrated comprises a multi-level vehicle storage structure constituted by two banks 1 and 2 of superimposed rows of vehicle storage compartments conveniently designated $1x_0y_0$ to $1x_3y_3$, and $2x_0y_0$ to $2x_3y_3$ on a co-ordinate basis. These banks of vehicle storage compartments are spaced apart with the entrances of corresponding compartments of the respective banks being located opposite one another so that a motor driven vehicle conveyor, such as in the form of a cage the floor of which is shown at 3, can be moved vertically and/or horizontally to a position between any pair of opposed compartments. This is achieved by mounting the cage for vertical movement within a tower 3a which is movable horizontally.

The ground-level compartments of bank 1 (i.e. compartments $1x_0y_0$ to $1x_3y_0$) may be reserved for receiving and holding vehicles subsequently to be parked in a vacant storage compartment of bank 1 or bank 2 while the ground-level compartments of bank 2 (i.e. compartments $2x_0y_0$ to $2x_3y_0$) on the other hand may conveniently be utilized for receiving vehicles discharged from the vehicle conveyor after being unparked from either bank 1 or bank 2.

The floors of the respective storage compartments together with the floor 3 of the vehicle conveyor are pivoted for restricted movement about axes extending parallel to the direction of horizontal travel of the vehicle conveyor and, as can be seen in FIG. 2, the floors of the storage compartments of bank 1 are normally oppositely inclined with respect to those of the compartments of bank 2 with the exception of floors of the ground-level compartments of both banks which may be fixed and similarly inclined. The floor of the vehicle conveyor may normally be inclined as shown in FIG. 2, that is to say it is similarly inclined to the floors of compartments $2x_0y_1$ to $2x_0y_3$.

In order to illustrate the operation of the installation so far described let it be supposed for example that a car located in compartment $1x_0y_0$ is required to be parked in compartment $1x_0y_2$ say. The vehicle conveyor will thus be driven to a position adjacent compartment $1x_0y_0$ such that the conveyor floor is aligned co-planarly with that of compartment $1x_0y_0$ as shown in FIG. 2A whereupon the retraction of vehicle stops VS and VS1 in the compartment and conveyor respectively permits the vehicle to move under gravity into the conveyor until it is arrested by stop VS2 for transit to parking compartment $1x_0y_2$. After raising the stops VS1 the vehicle conveyor will then be hoisted in response to the energisation of its driving motor until it reaches position A (FIG. 2) between the storage compartments $1x_0y_2$ and $2x_0y_2$ with the conveyor travelling at reduced speed for a short distance before reaching position A (FIG. 2) whereupon the driving motor is de-energised followed by the actuation of bolts for coupling together at D adjacent floor edges of the conveyor and compartment $1x_0y_2$. The vehicle conveyor is next hoisted through a short distance to position B (FIG. 2) whereby the conveyor floor is tilted counter clockwise about its pivot into the same plane as the inclined floor of parking compartment $1x_0y_2$. Consequently the car carried by the conveyor can then move under gravity into compartment $1x_0y_2$ after the retraction of the vehicle stops VS1 on the conveyor, with further stops or buffering means (not shown) being provided to arrest the vehicle at a suitable location within the parking compartment. The vehicle conveyor, after discharging the car, and after restoration of the stops VS1 is then lowered from position B to position A thereby effecting clockwise tilting of the conveyor floor to its normal position followed by the withdrawal of the locking bolts from the adjacent floor edges of the conveyor and compartment $1x_0y_2$ to permit the conveyor to be driven to another compartment of the banks 1 and 2 for the purpose of parking or unparking a further vehicle. In order to unpark or remove the vehicle deposited as above described the unloaded conveyor is again driven to position A whereupon the floor locking bolts are actuated in order to couple the floor of the conveyor with that of the compartment $1x_0y_2$, but instead of then hoisting the conveyor to position B as for parking, the conveyor is lowered to a position C whereby the floor of the compartment $1x_0y_2$ is tilted in the clockwise direction so that the parked car can be discharged into the conveyor by reason of the retraction of stops VS1 in the conveyor. After restoration of the stops VS1 the conveyor loaded with the unparked car is next hoisted to the initial position A so that the floor of compartment $1x_0y_2$ is restored to its normal position in readiness for parking a further vehicle. The floor locking bolts are withdrawn and the conveyor is then lowered to compartment $2x_0y_0$ to discharge the unparked vehicle. The vehicle stops VS2 in the conveyor are lowered to permit the exit of the vehicle into compartment $2x_0y_0$. For parking vehicles in or unparking vehicles from the compartment $2x_0y_2$ (i.e. the compartment opposite $1x_0y_2$ considered above) the sequence of operations differs from that above described in so far that the conveyor will be hoisted to position B before the floor locking bolts are actuated for coupling the edge of the conveyor floor with that of compartment $2x_0y_2$. For parking, tilting of the conveyor and/or compartment floors is not required but for unparking a vehicle the floors of the conveyor and compartment are tilted counter clockwise about their respective pivots after locking by means of the locking bolts by lowering the conveyor to position C. The conveyor is then hoisted to position B after the actuation of vehicle stops on the conveyor and the floor locking bolts then withdrawn.

For the sake of simplicity the above described operation of the installation has been restricted to vertical travel of the conveyor within its tower $3a$ between one pair of opposed columns of storage compartments but it should be understood that the conveyor is arranged to be moved horizontally as well as vertically to any selected compartment of the banks 1 and 2.

Having briefly outlined the operation of the parking installation, the control system according to the invention for controlling the various operations to be performed for parking or unparking vehicles will now be described with reference to FIGS. 3 to 8.

Referring firstly to FIG. 3, the position in the vehicle storage structure to which the conveyor is to be driven prior to parking or unparking a vehicle is preselected by means of selector switches X and Y respectively having a number of switching positions at least corresponding in number to the number of storage compartments in each row and column of bank 1 or bank 2. Accordingly, in the present example both selector switches X and Y will have at least four switching positions designated 0 to 3. If therefore it is required to drive the vehicle conveyor to a position between opposed compartments $1x_1y_1$ and $2x_1y_1$ the selectors X and Y will both be set to switching position 1. The selector switches X and Y may comprise manually-operable switches but, if desired, uniselector switches of the type commonly used in automatic telephone exchange systems may alternatively be employed with means such as a dial switch for transmitting trains of setting impulses to the switches being provided.

Outlets of selector switches X and Y are connected with blocks CDX and CDY, respectively, representing circuit arrangements for respectively controlling horizontal and vertical movement of the conveyor to a position predetermined in accordance with the setting of selector switches X and Y and the operation of other control means hereinafter to be described. One suitable circuit arrangement for controlling the vertical drive will hereinafter be more particularly described with reference to FIGS. 4, 4A and 4B. The wipers or other moving contact members of the selector switches X and Y are connected with outlets of sequence switching means conveniently constituted by uniselectors P1, P2, UP1, and UP2 arranged to be stepped from one switching position to another at prearranged intervals under the control of associated relays (not shown). The sequence switches P1 and P2 on the one hand control the sequence of operations required for parking a vehicle in compartments of banks 1 and 2, respectively, while switches UP1 and UP2 on the other hand serve for controlling the sequence of operations for removing or unparking a vehicle from banks 1 and 2, respectively. Selection of the sequence switch appropriate to the operation to be carried out is obtained by means of a four-position selector switch S the moving contact member of which is connected to a source of potential such as through a push-button start switch ST. Thus it will be observed that by selection of a sequence switch from the switches P1, P2, UP1 and UP2 and by setting of the selector switches X and Y the compartment to be utilised for parking or from which a vehicle is to be unparked is preselected.

By way of illustration it may be supposed that a vehicle is required to be parked in storage compartment $1x_0y_2$ so that the sequence switch will be selected by the switch S and the selector switches X and Y will be set at switching positions 0 and 2 respectively. As previously mentioned in connection with the operation of the installation for the parking and unparking of vehicles, the conveyor, after having been driven to a position adjacent the selected storage compartment may be moved at reduced speed by a short distance upwardly and/or downwardly, as required, and for the control of such movements levelling unit LU and tilting units T are provided. These units are under the control of the selected sequence switch appropriate to the operation to be performed and are brought into operation in predetermined sequence after the requisite storage compartment has been reached by the conveyor. The form and operation of the units LU and T will be fully described with reference to FIGS. 4, 4A, 4B and 7. The actuation of the previously mentioned locking bolts and vehicle stops represented by the blocks B and VS is effected through the agency of electro-hydraulic thrustors or other power-actuated devices operable in predetermined sequence and time relation to the operations controlled by the sequence switch selected.

A suitable circuit arrangement for controlling initial vertical drive of the conveyor to a position adjacent the selected compartment and including the selector switch Y is shown in FIG. 4 from which it can be seen that circuits for the energisation of relays PU and PD which control the operation of contactors U and D, respectively, which in turn control the direction of vertical drive of the conveyor, are under the joint control of selector switch Y and switches S0 to S3 respectively operated by the conveyor as it reaches a position at which the conveyor may be reduced in speed before reaching position A for bank 1 or position B for bank 2 at the level corresponding to the numerical suffix of the switch. For example, switch S2 opens as the conveyor reaches the slow down position prior to stopping at position A or position B, as the case may be, at the second level of the storage structure. The travel to position A for compartment $1x_0y_2$ or to position B for compartment $2x_0y_2$ is controlled by the operation of levelling units.

In FIG. 4B, there are shown six pliotron units PL1 to PL6 which are carried by the vehicle conveyor, and metal vanes V1 to V6 (FIG. 7) provided at each level of pairs of opposed columns of the installation, will be disposed between sensing coil means SC (FIG. 7) of their associated pliotrons at at least one of the positions A, B and C of the conveyor. The pliotrons PL2, PL3, PL5 and PL6 comprise the previously mentioned levelling units LU and contain relays LRUB, LRU, LRDB and LRD and their respective anode circuits. The pliotron units PL1 and PL4 having relays TU and TD connected in the anode circuits thereof comprise the hereinbefore referred to tilting units T.

Means for actuating locking bolts for coupling the floor of the conveyor to that of a selected compartment are shown in FIGS. 5 and 6 and comprise an electrohydraulic thrustor device TH carried by the conveyor and arranged to be energised from a power supply in response to the operation of a contactor BT having normally open contacts BT1. When the thrustor TH is energised a bolt B is urged against the action of restoring spring N through floor slots FS into contact with one end of a spring-urged pivoted arm PA mounted under the floor of the compartment. The arm PA turns about its pivot so that a further bolt BB carried at the end of the arm remote from the bolt B is urged through floor slots FS1 into contact with a spring arm SA to effect closure of contact BLS.

The vehicle stops for locating and/or retaining a vehicle within a vehicle receiving compartment (e.g. $1x_0y_0$) may for example be actuated in response to the operation of a roller-lever switch RS located on the front of the compartment as illustrated by FIG. 8. The switch RS in the example taken is operated by an electro-hydraulic thrustor TH1 carried by the conveyor and operated in response to the energisation of contactor CTH1 at the appropriate time under the control of the selected sequence switch.

A sequence of operations for parking a vehicle in one of the vehicle storage compartments will now be described. Let it be assumed that the vehicle to be parked is located in compartment $1x_0y_0$ and that the conveyor has previously been positioned adjacent the compartment with the floor of the conveyor similarly inclined and aligned with that of compartment $1x_0y_0$ as shown in FIG. 2A. By reference to a supervisory lamp display or other means (not shown) indicating vacant parking compartments, an operator will set the selector switches X and Y and the switch S so as to preselect the particular compartment to be used for parking, such as for example compartment $1x_2y_2$. With selector switches X and Y set in positions 2 and 2 respectively, and with the switch S set to select sequence switch P1 the push-button start switch ST is then depressed momentarily to apply a stepping impulse to the sequence switch P1. The latter switch completes a circuit for the operation of the thrustor TH1 carried by the conveyor in order to operate the roller-lever swith RS located on the front of compartment $1x_0y_0$ for bringing about the retraction of vehicle stops VS in the latter. At the same time a circuit is completed for operating electrohydraulic thrustors for the retraction of vehicle stops VS1 in the conveyor thereby permitting the vehicle to roll forward under gravity into the conveyor. After a predetermined time delay the sequence switch P1 is stepped on to its next outlet by the delivery of a stepping impulse to the switch from a switch similar to BLS in FIG. 6 but closed by the action of the vehicle meeting vehicle stops VS2 set to limit the travel of the vehicle through the conveyor, and in so doing de-energises the thrustors so as to restore stops VS1; switch P1 stepping on completes a circuit through selector switch X, and switches corresponding to switches S0 to S3, for the energisation of a relay which in operating operates a contactor for producing horizontal drive of the conveyor tower $3a$ to the column of storage compartments including compartment $1x_2y_2$. The drive of the conveyor tower is interrupted by the release of the last-mentioned relay and contactor when the requisite column is reached and the sequence switch P1 is then pulsed to step it on to the next outlet whereby a circuit is established for providing upward movement of the conveyor within the tower $3a$ by the energisation of relay PU through selector switch Y and switch S2, and the consequent operation of contactor U by the closure of contacts PU1. Contacts PU1 also complete an energising circuit for contactor SB so as to release the hoist brake. Contacts PU2 of relay PU and contacts U1 of contactor U establish an energising circuit for contactor AR which in operating completes a circuit by the closure of contacts AR1 for the the energisation of contactor A contacts of which (not shown) connect the conveyor driving motor for fast drive. Contacts AR2 open to prevent operation of contactor R which would otherwise provide slow drive of the conveyor. Contactors RU and RD are operated over circuits including contacts of the levelling units and tilting units prefixed LRD, LRU, LRDB, LRUB, TU and TD, respectively, and contacts RU1 and RD1 in closing complete a circuit through contacts AR3 for the operation of contactor LC. Contacts LC1 provide a holding circuit for contactor LC when relay AR releases and contacts LC2 provide a holding circuit for contactor U independently of contact PU1.

When the conveyor reaches the slow down point for the first level of the storage structure switch S1 opens (and later connects to the coil PD), but the upward drive circuit for the conveyor is still maintained due to the continued operation of relay PU and contactor U. When the conveyor approaches the corresponding position at the second storage level the switch S2 opens. As switch S2 opens, relay PU is de-energised thereby effecting the disconnection of the energising circuit for contactor AR by the opening of contacts PU2 and contactor AR in releasing establishes a circuit through contacts AR2 for the energisation of contactor R which brings about slow running. By the closure of contacts PU3 relay LRU connected in the anode circuit of pliotron unit PL3, will operate as soon as the lower end of vane V2 passes between the sensing coils of the pliotron as will be apparent from a consideration of FIG. 7. During the period of time elapsing between the release of relay PU and the operation of relay LRU the contactor U is maintained operated over the circuit including contacts LC2 and U2 but the motor is connected for slow upward drive of the conveyor by the energisation of contactor R as indicated above. When relay LRU operates, the energising circuit for contactor RU is interrupted at contact LRU1 and the opening of contact RU1 de-energises contactor LC. Contactor RD, however, remains operated and consequently the contactor U is held operated over contacts RD1 and LRU2 when contacts LC2 open.

The conveyor is thus driven upwards at slow speed until position A (FIG. 2) is reached. Relay LRU then releases due to the passage of pliotron unit PL3 beyond the top end of vane V2 and contactors U and SB release to maintain the conveyor at position A. The sequence switch P1 is then stepped on to the next outlet and thereby completes an energising circuit for contactor BT (FIG. 6) which in operating closes contacts BT1 to connect a power supply to the electro-hydraulic thrustor TH for driving bolts B and BB through slots FS and FS1, respectively, provided in the adjacent floor edges of the conveyor and compartment $1x_2y_2$. Upon the bolts being driven home the contacts BLS close and complete a stepping circuit for the sequence switch P1 which accordingly steps on to its next outlet. With the contactor BT maintained operated contacts Z are closed as so to complete an operating circuit for relay TU associated with the pliotron unit PL1 due to the lower end of vane V5 being located between the sensing coils of pliotron PL1. Relay TU in operating closes a circuit at contacts TU1 for energising contactors U and SB as a result of which the conveyor is hoisted at slow speed to position B causing the floor of the conveyor to be tilted in a counter-clockwise direction about its pivot into the same plane as the compartment floor by reason of the coupling at D between the floors of the conveyor and compartment $1x_2y_2$. At position B, relay TU releases with contacts TU1 in opening interrupting the energising circuit for contactors U and SB thereby stopping the motor drive and applying the brake. The sequence switch P1 steps to the next outlet, relay Z is de-energised and opens its contact to prevent relay TU from operating; the thrustors for stops VS are energised for retraction of the latter so that the vehicle carried by the conveyor can move under gravity into compartment $1x_2y_2$. When relay TU releases, relay RU operates as a result of the closure of contacts TU2 and since relay LRD is ready to operate due to the top of vane V1 being located between the sensing coils of pliotron unit PL6, and contactor U has released, another circuit is established by P1 via contacts LRD2, RU1 and U3 for the energisation of contactor D and brake release contactor SB. Contactor R being energised, the conveyor, having discharged the vehicle into compartment $1x_2y_2$ is lowered at slow speed until it reaches position A whereat relay LRD releases and the conveyor is arrested by the disconnection of the circuit for the operation of contactors D and SB at contacts LRD2. The contactor BT is then deenergised by the sequence switch stepping to the next outlet and the bolts B and BB are withdrawn from the floor edges by the action of bolt restoring springs. The contacts BLS open as a consequence of which the sequence switch P1 may then be connected for self-driving to a homing contact in readiness for controlling the next parking operation while the conveyor may be driven to any other position in the storage structure for performing a parking or unparking operation by appropriate resetting of the various selector switches and control means.

For unparking the vehicle from compartment $1x_2y_2$ the conveyor will first be driven at fast and then at slow speeds to position A adjacent compartment $1x_2y_2$. According to whether the conveyor when taken into use is located above or below the selected compartment, either contactors D and SB or U and SB will be employed after the selection of sequence switch UP1 and the positioning of selector switches X and Y in positions 2. Contactors D and SB will be connected to provide fast drive of the conveyor due to closure of contacts PD1 if the conveyor is located above the compartment $1x_2y_2$. When the conveyor reaches the slow down position the circuit initially closed for the energisation of relay PD through the selector switch Y and lower position of switch S2 is interrupted by the opening of the latter switch. As in the case for parking, when relay PU releases consequent upon the conveyor approaching level A, the contactor AR now releases and contactor R operates to connect the motor for slow drive. Contactor LC will have been operated initially due to closure of contacts AR3 and the closure of contacts RU1 and RD1 of operated contactors RU and RD but contactor LC remains operated over holding contacts LC1 thereof and consequently maintains the energising circuit for contactor D over contacts LC2 and D1 until relay LRD operates. Relay LRD operates when the conveyor is approximately at position B since the top end of vane V1 is located between the sensing coils of pliotron unit PL6. Relay LRD in operating disconnects the operating circuit for contactor RD at contacts LRD1. Contactor RD as it releases causes contactor LC to be de-energised but an alternative holding circuit independently of contactor LC is completed for contactors D and SB over contacts RU1 and LRD2. Thus the conveyor is driven down until it reaches position A whereat relay LRD releases to bring about the interruption of the motor drive and the application of the motor brake by the release of contactors D and SB. After a predetermined time delay the sequence switch UP1 will be stepped on to a further outlet to effect operation of the thrustor TH by the energisation of contactor BT for coupling the floor of the conveyor to the floor of the compartment $1x_2y_2$ as hereinbefore fully described for the parking operation. The consequent closure of contacts BLS causes the sequence switch UP1 to be stepped and thereby bring about the closure of contacts Q, with contactor BT being held operated. As is apparent from FIG. 7, vane V6 is disposed between the sensing coils of pliotron unit PL4 so that relay TD operates and thereby completes an energising circuit for contactors D and SB and contacts TD1. Contactor R being operated, the conveyor will be driven down at slow speed causing the floor of the compartment $1x_2y_2$ to be tilted in a clockwise direction about its pivot until the relay TD releases when the conveyor reaches position C whereat the parked vehicle can move under gravity out of the compartment into the conveyor after the retraction of the stops VS1 (FIG. 2) on the conveyor. After position C has been reached the relay LRU is energised so that when relay TD releases at position C the sequence switch UP1 steps to the next outlet and a circuit is provided for the energisation of contactors U and SB via contacts RD1 and LRU2 while the thrustors operating vehicle stops VS1 are de-energised. Consequently the conveyor carrying the vehicle is now driven upwards to position A to restore the floor of compartment $1x_2y_2$ to its original position in readiness for receiving a further vehicle. At position A the relay LRU releases to cut the conveyor drive. The sequence switch UP1 is stepped on for the de-energisation of contactor BT so that bolts B and BB retract under the action of their restoring springs. The conveyor is now free to be lowered to one of the ground level compartments of bank 2 for discharging the vehicle carried thereby by resetting of the various selector and sequence selecting switches.

For parking and unparking cars in bank 2 the sequence switches P2 and UP2 will be selected. To park in compartment $2x_2y_2$ for example the conveyor is driven upwards at fast speed to position where switch S2 opens from which it is then driven upwards at slow speed to position B under the control of relay LRUB operable by pliotron PL2. To unpark a vehicle from compartment $2x_2y_2$ the conveyor may similarly be driven up to position B where its floor will be locked to the floor of compartment $2x_2y_2$; then downwards at slow speed through position A to position C, under the control of relay TD and the vane V6. It will stop when the pliotron unit reaches the end of vane V6. At C the two floors will be aligned so that the vehicle within compartment $2x_2y_2$ is discharged into the conveyor after the retraction of stops VS2. After the de-energisation of thrustors controlling stops VS2 the conveyor is then raised to position B under the successive control of relay LRUB for the purpose of restoring the floors of the compartment and the conveyor to their normal inclined position. These floors are then uncoupled consequent upon the de-energisation of contactor BT and the conveyor driven to a selected ground level compartment of bank 2.

The electric motors used for driving the conveyor may be of any type capable of being regulated in the manner required.

With the exception of local circuits in the fixed structures which can be controlled from the conveyor by operation of a cam as already described all power operated apparatus is mounted on the conveyor. Power for all purposes therein would be collected by electrical contacts sliding on bare electric conductors extending the whole length of the horizontal track of the conveyor, or other well known means. Power for the control circuits would preferably be D.C. and in the case of A.C. power supply to the conveyor, suitable rectifying devices would be used to convert the A.C. into D.C. The various selector switches, sequence switches and associated relays and start switch may be housed for example in a control cubicle from which the operation of the installation may be supervised.

What I claim is:

1. A load conveying installation comprising a multi-level load storage structure; storage compartments in said structure; a load conveyor and driving means therefor; pivoted floors on the load conveyor and on said storage compartments; electrically actuated means for locking the pivoted floor of the conveyor to the pivoted floor of one of said storage compartments and permitting selective movement under gravity of a load between the conveyor and the said one storage compartment, said selective movement being dependent on a predetermined relative relationship between the conveyor and the said one compartment and the direction of inclination of the floors thereof; a multi-position selector switch adapted to be pre-set according to the desired selective movement; a plurality of sequence switches selectable by the setting of the multi-position selector switch and operable at predetermined intervals for initiating and controlling a desired sequence of operations, including operation of the electrically-actuated floor locking means; switching means for at least partly selecting the said storage compartment and for controlling said driving means for moving said conveyor to the predetermined relative relation adjacent the said selected storage compartment during at least one phase of the said sequence of operations; a plurality of conveyor vertical position responsive switches operable in predetermined sequence and at appropriate intervals by said selected sequence switch for providing relatively short vertical displacement of said conveyor, after actuation of the electrically actuated floor locking means at least during removal of a load from the said storage compartment, thereby providing the desired inclination of floors.

2. A load conveying installation as claimed in claim 1, and further comprising electrically-actuated load stops provided in the conveyor and controlled by the sequence switches.

3. A load conveying installation as claimed in claim 2, in which the switching means for controlling the driving means of the conveyor comprises at least one group of mechanically-actuated switches which maintain a driving circuit for the conveyor until said selected storage compartment is reached.

4. A load conveying installation as claimed in claim 2, in which the storage compartments form horizontal and vertical rows and in which the switching means for controlling the driving means of the conveyor comprises groups of mechanically-actuated switches appertaining to respective columns of compartments in the load storage structure for controlling horizontal movements of the conveyor to that column containing a selected compartment and groups of mechanically-actuated switches appertaining to respective rows of storage compartments of said load storage structure for controlling vertical drive of the conveyor to said selected compartment.

5. A load conveying installation as claimed in claim 4, in which the switching means for selecting a storage compartment comprises a pair of additional selector switches, one of which selects the column containing said compartment and the other of which selects the row of said compartment in the storage structure, said additional selector switches being respectively connected in circuits containing the groups of mechanically-actuated switches appertaining to the respective columns and rows of the load storage structure.

6. A load conveying installation as claimed in claim 1 and wherein the load storage structure is formed by two opposed groups of storage compartments, each group comprising superimposed storage compartments and the two groups defining an air space therebetween, permitting the conveyor to be driven to a position adjacent any pair of opposed compartments, in which said system provides for the conveyor to be driven to a selected compartment under the control of the switching means for at least partly selecting said storage compartment, and in which the selection of one compartment from a pair of opposed compartments, including the selected compartment, is effected by the multi-position selector switch.

7. A load conveying installation as claimed in claim 1, in which the conveyor vertical responsive switches comprise a number of pliotron units having sensing means, said units being carried by the conveyor, and metallic vanes secured to the storage structure, said vanes being operable sequentially as determined by the selected sequence switches and by the disposition of said metallic vanes relative to said sensing means of the pliotron units when the conveyor reaches a position adjacent the selected compartment.

8. A load conveying installation as claimed in claim 1, in which the electrically actuated floor locking means comprises locking bolts and at least one electrohydraulic thrustor, which is operating causes the bolts to be forced between adjacent edges of the floors.

9. A load conveying installation as claimed in claim 2, and further comprising power-actuated devices for actuating the load stops, local electrical switching means for controlling load stops in a load storage compartment, and a power driven element mounted on the conveyor for operating said local electric switching means.

References Cited in the file of this patent

UNITED STATES PATENTS

| | | |
|---|---|---|
| 1,288,567 | Hall | Dec. 24, 1918 |
| 2,451,368 | White et al. | Oct. 12, 1948 |
| 2,663,446 | Romain | Dec. 22, 1953 |
| 2,707,666 | Becker | May 3, 1955 |
| 2,915,203 | Kurmer | Dec. 1, 1959 |